July 26, 1949.  S. D. FULLER  2,477,294
HAND TRUCK
Filed Aug. 2, 1946
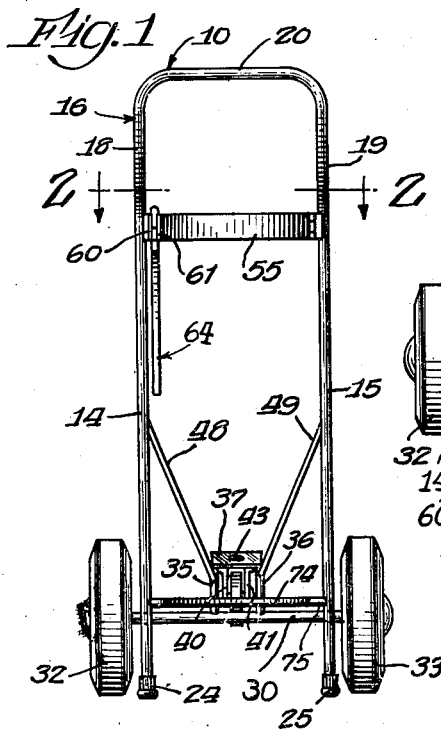
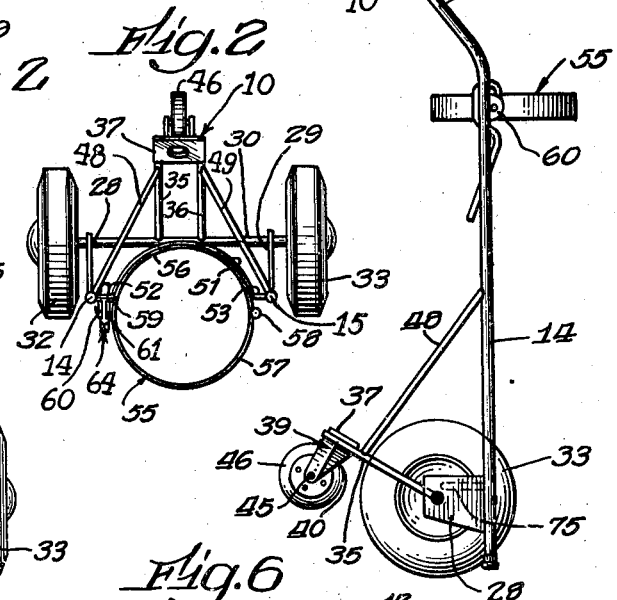
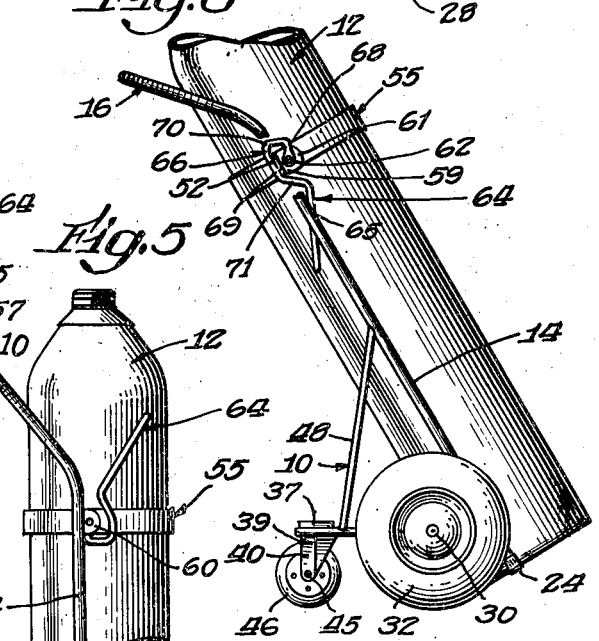
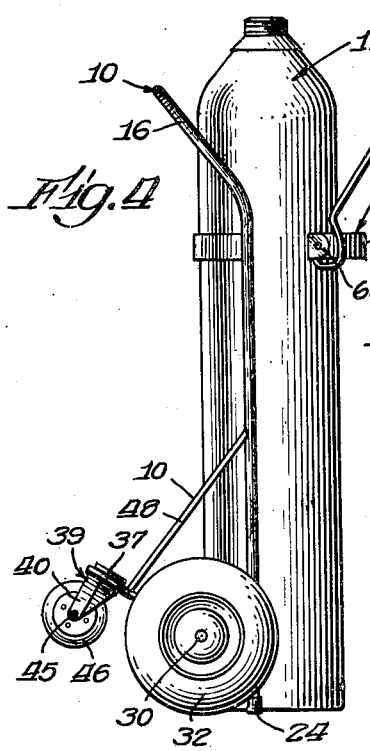
INVENTOR.
Stanley D. Fuller
BY Wallace & Cannon
ATTYS.

Patented July 26, 1949

2,477,294

UNITED STATES PATENT OFFICE 2,477,294

HAND TRUCK

Stanley D. Fuller, Sussex, Wis.

Application August 2, 1946, Serial No. 687,908

5 Claims. (Cl. 214—66)

This invention relates to hand trucks and more particularly to that type of truck especially adapted for carrying elongated articles such as commercial tanks of oxygen or acetylene.

Trucks for carrying bottles of oxygen or the like are, in and of themselves, relatively old in the art. However, most trucks of this character heretofore known to the art have included a projecting portion upon which the bottles must be set for support thereby and, therefore, it has been necessary to tilt or lift the bottle when loading it and, inasmuch as these bottles are relatively large and heavy, this is a somewhat difficult and undesirable task. It is the primary object of my invention to associate the parts of a new and novel truck or cart in such a manner that elongated articles such as oxygen bottles or the like may be loaded thereon for transporting thereby without tilting or lifting the article so loaded.

An ancillary object of my invention is to construct a truck having an open bottom which may be wheeled up adjacent to an upstanding or upright oxygen bottle, or the like, and the bottle mounted on the truck by a single simple clamping operation.

It is a further object of my invention to associate the parts of a truck in such a manner that after an oxygen bottle or the like has been properly secured thereto for transportation thereby, the truck may be easily moved to transporting position wherein it is fully supported by rollers or wheels on which it may normally be rolled or pushed along without the person so rolling or pulling it exerting lifting force on the truck.

It is another object of my invention to associate a flexible tank-encircling band with the frame of a truck in such a manner that the band may be fastened around an oxygen tank, or the like, in gripping or supporting relation, and in which the band, when so fastened, is fully capable of supporting the oxygen tank or the like from the frame of the truck.

An object ancillary to the foregoing is to associate a tank-encircling band with the frame of a truck in such a manner that the band may be quickly and easily fastened around an oxygen tank, or the like, transversely to the longitudinal axis thereof and in tight frictional engagement therewith, and which band, when so positioned, is fully capable of retaining the tank on the truck and preventing either lateral or longitudinal movement of the tank relative to the truck.

A further object of my invention is to associate a pivoted locking member with a flexible or hinged band on a tank carrying truck in such a manner that the locking member may be quickly and easily moved into position to secure the band in tank-carrying position and may be as quickly and easily released from such securing position, by manually pivoting the locking member.

Other and further objects of the present invention will be apparent from the following description and claims and are illustrated in the accompanying drawing which, by way of illustration, shows a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a front elevational view of a truck or cart adapted to transport oxygen bottles or the like and embodying the principles of my invention;

Fig. 2 is a view taken substantially along the line 2—2 in Fig. 1;

Fig. 3 is a side elevational view of the truck shown in Figs. 1 and 2, with one wheel removed;

Fig. 4 is a side elevational view similar to that shown in Fig. 3 and showing the truck standing adjacent to an oxygen bottle in loading position, and showing the flexible band thereof in partially closed position with respect to the oxygen bottle;

Fig. 5 is a partial side elevational view similar to Fig. 4, but showing the band thereof in fully closed position with respect to an oxygen bottle, as it would appear just prior to being locked in this position; and Fig. 6 is a side elevational view of the cart shown in Figs. 1 to 5, but showing the cart in loaded position wherein it is ready to transport the oxygen bottle shown secured thereto, part of the side frame being broken away to show the locking member on the flexible band in locked position.

My invention is illustrated in the accompanying drawings as embodied in a truck or cart 10 which is especially adapted to carry an elongated article such as an oxygen bottle 12 or the like. The truck 10 has side members or side legs 14 and 15 which are substantially parallel to each other and the upper end portions of which are curved to form a handle 16 having side arms 18 and 19, and an upper cross bar 20. The lower end portions of the side legs 14 and 15 are preferably padded or covered by caps 24 and 25, respectively, and form feet which, as will be described in greater detail hereinafter, assist in supporting the truck 10 during the loading thereof. The caps 24 and 25 may be made of any suitable material such as rubber or the like.

In the following description of my invention, the "front" and "rear" of my truck will be considered to the right and left, respectively, as viewed in Fig. 3.

Brackets 28 and 29 are secured to the lower portion of the side legs 14 and 15, respectively, by welding or other suitable means, and project rearwardly therefrom. An axle 30 extends transversely through and is secured to the supporting brackets 28 and 29, and wheels 32 and 33 are rotatably mounted upon either end thereof. Two substantially parallel braces 35 and 36 are secured to, and extend rearwardly from the axle 30 and the rearwardly extending free end portions of the braces 35 and 36 are interconnected by a plate 37 which extends across the top thereof and is secured thereto by welding or other suitable means. As best seen in Figs. 1 and 3, a channel-shaped bracket 39 having downwardly extending legs 40 and 41 is pivotally connected to the under surface of the plate 37 by a swivel pin or bolt 43 which extends through and depends from the center portion of the plate 37. An axle 45 extends through and is carried by the downwardly extending legs 40 and 41 of the channel-shaped bracket 39 and a caster wheel 46 is rotatably mounted upon the axle 45 between the downwardly extending legs 40 and 41. Two hanger braces 48 and 49 further support the brace members 35 and 36 from the side legs 14 and 15, each of the hanger braces 48 and 49 having one end portion connected to the side legs 14 and 15, respectively, and the other end portion thereof connected to the rearwardly extending brace members 35 and 36.

As is best seen in Fig. 2, a curved backing member or backing band 51 having outwardly extending ears 52 and 53 extends between the side legs 14 and 15 and the outer edge portion of the ears 52 and 53 are welded to the side members 14 and 15. A hinged band 55, substantially circular in shape and having a rear band member 56 and a front band member 57 hingedly or pivotally connected thereto by a pin 58, is carried by the backing member 51, the rear band 56 being secured thereto by any suitable means such as, for example, by spot-welding. The free end portion of the front band 57 has an ear 59 formed thereon which, when the flexible band 55 is closed, is adjacent to, and extends parallel to, the ear 52 on the backing member 51 for a purpose which will be explained in greater detail hereinafter.

Two flanges 60 and 61 extend forwardly from the ear 59 on the front band 57 and are spaced from and substantially parallel to the outer curved surface of the front band 57. A pin 26 interconnects the pair of flanges 60 and 61 and, as is best seen in Figs. 2 and 6, a substantially hooked shape locking member 64 has one end thereof rotatably or pivotally mounted on the pin 62. The free end portion of the locking member 64 forms a hand grip 65 and the other end portion thereof forms a hook-shaped locking head 66, the locking head 66 having a front leg 68, a rear leg 69, an intermediate leg 70 interconnecting the front leg 68 and the rear leg 69, and an offset leg 71 interconnecting the rear leg 69 to one end of the hand grip 65.

A lower cross bar 75 having a curved portion 74 which is substantially the same as, and in substantially vertical alignment with, the rear band member 56, extends between and is connected to the lower end portions of the side legs 14 and 15 for purposes which will be presently described in greater detail.

As is best seen in Figs. 4, 5 and 6, when it is desired to load an oxygen bottle 12 or the like, onto my truck or cart 10, the truck 10, with the front band member 57 of the hinged band 55 swung completely outwardly, is wheeled up to the upstanding oxygen bottle 12 on the wheels 32, 33 and 45 and is then tilted upwardly into the normal loading position shown in Fig. 4 wherein the side legs 14 and 15 extend substantially vertically upwardly along and adjacent to the sides of the bottle 12 and the curved portion 74 of the cross bar 75 and the inner surface of the rear band 56 presses against the curved surface of the rear of the oxygen bottle 12. It will be noted that the feet or lower end portions of the side legs 14 and 15 extend the proper distance past the axle 30, which forms the center of the wheels 32 and 33, so that when the truck 10 is in the normal loading position shown in Fig. 4, the lower ends of the feet engage the floor or other supporting surface upon which the wheels 32 and 33 rest, and assist the wheels 32 and 33 in supporting the frame of the truck 10 in loading position wherein the side legs 14 and 15 are disposed substantially vertically.

After so positioning the truck 10 in loading position the front band 57 is swung inwardly through the position shown in Fig. 4 into the fully closed position shown in Fig. 5, and the handle or locking member 64 is then turned in a counterclockwise direction, as viewed in Fig. 5, from the position shown in Fig. 5 to the position shown in Fig. 6 in which latter position the rear leg 69 of the locking member 64 presses tightly against the rear surface of the ear 52 on the backing member 51 so that the ear 59 is pulled tightly against the front face of the ear 52 between the front leg 68 and the rear leg 69 of the substantially hooked-shaped locking head 66. It will be noted that the substantially hooked-shaped locking head 66 is so shaped that when it is turned in a counterclockwise direction, as viewed in Fig. 5, the offset leg 71 is the first to engage the rear of the ear 52 so that during continued turning of the locking member 64 the ears 52 and 59 are cammed tightly together. It will be noted that when the locking member 64 is in locked position the locking head 66 is turned downwardly in a counterclockwise direction, as viewed in Fig. 6, sufficiently far that the thrust between the rear band 56 and the front band 57 of the flexible band 55 cannot be effective to cause the locking member 64 to turn in a clockwise or releasing direction.

Also it will be noted that the normal inside diameter of the flexible band 55 is sufficiently less than the outside diameter of the bottle 12 that, when the band 55 is closed around the bottle 12 and is locked in this position by the locking member 64, the band 55 grips the bottle 12 sufficiently tightly that it is fully capable of supporting the same and securely holding it against longitudinal or other movement, the front band member 57 together with the rear band member 56 and the lower cross bar 75 preventing lateral displacement of the bottle 12, and the tight frictional engagement of the front band member 57 and the rear band member 56 with the sides of the bottle 12 preventing the longitudinal displacement of the bottle 12.

The bottle 12 having been mounted on my truck 10 in the manner just described, the truck 10 may be swung into loaded or transporting position by the operator pressing downwardly with his hands on the handle 16 or pressing downwardly with his foot on the plate 37, and thereby causing the frame of the truck 10 to pivot about the main wheels 32 and 33 into position where the caster wheel 46 is in supporting engagement with the floor or other surface on which the cart is standing, and in which position, as is best shown in Fig. 6, the bottle 12 is supported at an angle by the truck 10 and may be rolled along on the wheels 32, 33 and 46 by pushing or pulling on the handle 16. In this connection it will be noted that the braces 35 and 36 are of proper length and the caster wheel 46 and main wheels 32 and 33 are properly proportioned and positioned with respect to each other that when the loaded truck 10 is placed in transporting position, as best shown in Fig. 6, the caster wheel 46 rests on the same floor or other supporting surface as the main wheels 32 and 33. Also it will be noted, in this connection, that the braces 35 and 36, the caster wheel 46 and the main wheels 32 and 33 are so positioned and proportioned that when the truck 10, with a bottle 12 loaded thereon, is placed in transporting position, as shown in Fig. 6, the center of gravity of the loaded truck 10 is well behind the main wheels 32 and 33 toward the caster wheel 46 so that the truck 10 will remain in this transporting position during the substantially horizontal pushing or pulling thereon which occurs during the normal transporting of a bottle 12 thereon. However, the balance of the loaded truck is sufficiently close to the wheels 32 and 33 that when it is desired to pivot the truck on the axle 30 about the wheels 32 and 33 back into the loading position, shown in Fig. 4, this may be relatively easily accomplished by manually pushing substantially vertically upwardly on the handle 16.

To release a bottle 12 from the cart 10 it is only necessary for the operator to turn the cart 10 from the loaded or transporting position shown in Fig. 6 to the loading or unloading position shown in Fig. 4 and to strike or pull the hand grip 65 of the member 64 upwardly in a clockwise direction, as viewed in Fig. 5, to thereby release the locking head 66 from its gripping relation to the ears 52 and 59, and then swing the front band member 57 of the flexible band 55 outwardly out of engagement with the front surface of the bottle 12 and back the cart 10 away from the unloaded bottle 12.

From the foregoing it will be seen that I have provided a novel truck which is especially well adapted to carry elongated articles such as, for example, commercial-size oxygen or acetylene bottles, and wherein it is unnecessary for the operator, in loading the truck, to tilt or lift the bottle onto the truck.

Also it will be noted that with my truck a person can easily roll or trundle an elongated article along by merely pushing on the truck and without exerting lifting force thereon.

Also it will be noted that my novel truck is so constructed that an oxygen tank, or the like, may be quickly and easily mounted thereon or unloaded therefrom.

While I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. A hand truck for carrying an elongated article and comprising a supporting frame, means for transporting said frame, means carried by said frame for embracing one side of an elongated article to be transported by said truck, means carried by said frame for embracing the other side of said article, and a member pivotally carried by said frame having a substantially hook-shaped portion, said hook shaped portion being engageable with both of said two last mentioned means to cam said two last mentioned means together.

2. In a hand truck of the type adapted to transport elongated bottles and including a supporting frame and wheels for moving said frame, the combination of a member carried by said frame and comprising a relatively stationary and a relatively movable portion, an ear connecting said member to said frame, another ear carried by said movable portion of said member, and a member pivotally carried by said frame and engageable with both of said ears for clasping said ears together.

3. In a truck of the type adapted to transport elongated bottles and including a supporting frame and wheels for moving said frame, the combination of a substantially circular shaped member comprising an elongated rear element and an elongated front element, said front element having one end portion hingedly connected to said rear element, means including an ear connecting said rear element to said frame, a second ear projecting from the other end portion of said front element, said front element being movable about said hinged connection into open or closed position relative to said rear element, said ears lying substantially parallel to and adjacent to each other when said front element is in said closed position, and a locking member pivotally attached to one of said elements and comprising a handle at one end and a substantially hook-shaped locking head at the other end, said locking member being pivotable into position to clamp said ears within said substantially hook-shaped locking head to thereby retain said front element in closed position.

4. In a hand truck of the type adapted to pick up an elongated article from a supporting surface and transport the article across the same, an elongated supporting frame having a loading position, wherein said frame extends substantially vertically, and a transporting position, wherein said frame extends at an acute angle to the vertical, means including one end portion of said supporting frame and a pair of wheels rotatably mounted on said frame for supporting and retaining said supporting frame in said loading position on such a supporting surface and adjacent to and in contact with such an article positioned on the supporting surface, a clamping member mounted on said supporting frame and adapted to be operatively engaged with such an article and operable when so engaged to hold the article against movement in any direction relative to said supporting frame in all positions of said frame, and means including said pair of wheels and a caster wheel rotatably connected to said supporting frame for supporting and retaining said supporting frame in said transporting position on such a supporting surface, said frame being pivotable upon said pair of wheels from said loading position to said transporting position, said caster wheel and said pair of wheels affording means on which said frame may be transported across said supporting surface when said frame is disposed in said transporting position.

5. In a hand truck of the type adapted to transport elongated articles across a supporting surface, an elongated supporting frame comprising a pair of parallel side members and a transverse member interconnecting said side members, each of said side members having a foot provided at one end thereof, a clamping member mounted on said frame and adapted to encircle and to be disposed in operative engagement with such an article to be transported to thereby secure the article on said frame against movement in any direction relative thereto, a pair of wheels rotatably connected to said supporting frame, said feet and said pair of wheels being adapted to simultaneously engage such a supporting surface to thereby support and retain said frame in one position wherein said clamping member may be disposed in said operative engagement with such an article in loading position on the supporting surface, said supporting frame being pivotable on said pair of wheels from said one position to another position to thereby move such an article operatively engaged by said clamping member from said loading position to a transporting position, a supporting member mounted on said frame and projecting therefrom, said supporting member being effective upon the application of a predetermined downward pressure thereon, when said frame is in said one position, to move said frame to said other position, and a caster wheel mounted on said supporting member and adapted to engage said supporting surface when said frame is in said other position, said pair of wheels and said caster wheel being adapted to support and retain said supporting frame in said other position on said supporting surface.

STANLEY D. FULLER.

REFERENCES CITED

The following references are of record in the file of this patent:

UNITED STATES PATENTS

| Number | Name | Date |
|---|---|---|
| 1,429,432 | Irrgang | Sept. 19, 1922 |
| 1,432,037 | Russell | Oct. 17, 1922 |
| 1,559,923 | West | Nov. 3, 1925 |
| 1,896,249 | Russell | Feb. 7, 1933 |
| 1,913,295 | Schreck | June 6, 1933 |
| 2,131,673 | Robinson | Sept. 27, 1938 |
| 2,381,858 | Austin | Aug. 14, 1945 |

FOREIGN PATENTS

| Number | Country | Date |
|---|---|---|
| 730,169 | France | May 9, 1932 |